Nov. 18, 1969      D. GABOR      3,479,111

THREE-DIMENSIONAL PICTURE PROJECTION

Filed Aug. 24, 1967      2 Sheets-Sheet 1

INVENTOR.
DENNIS GABOR

BY Brumbaugh, Free, Graves & Donohue his ATTORNEYS

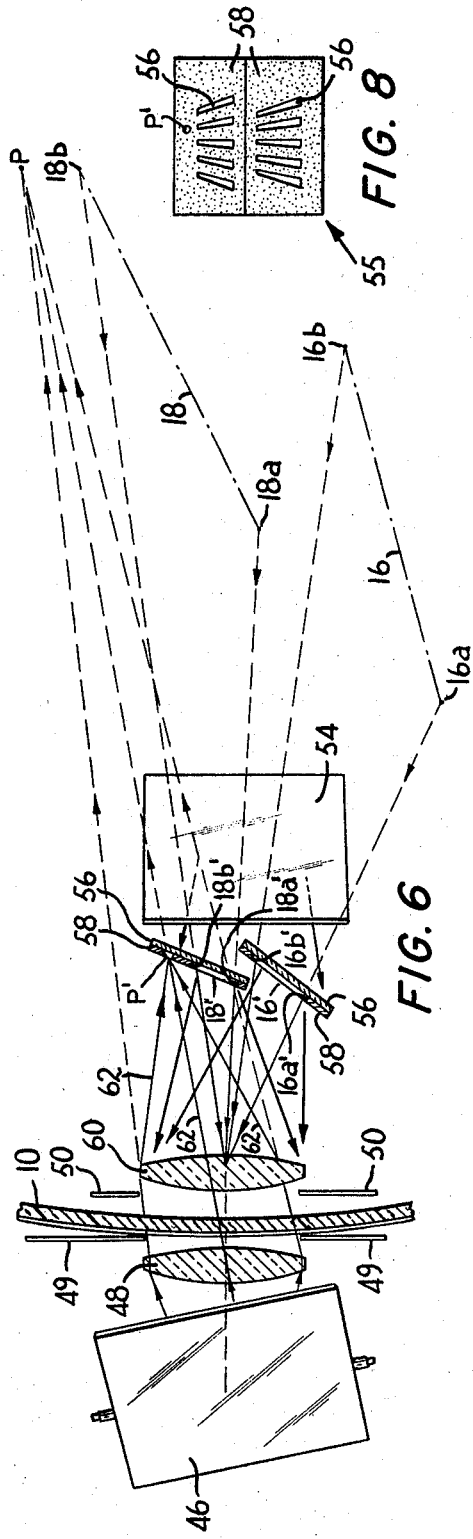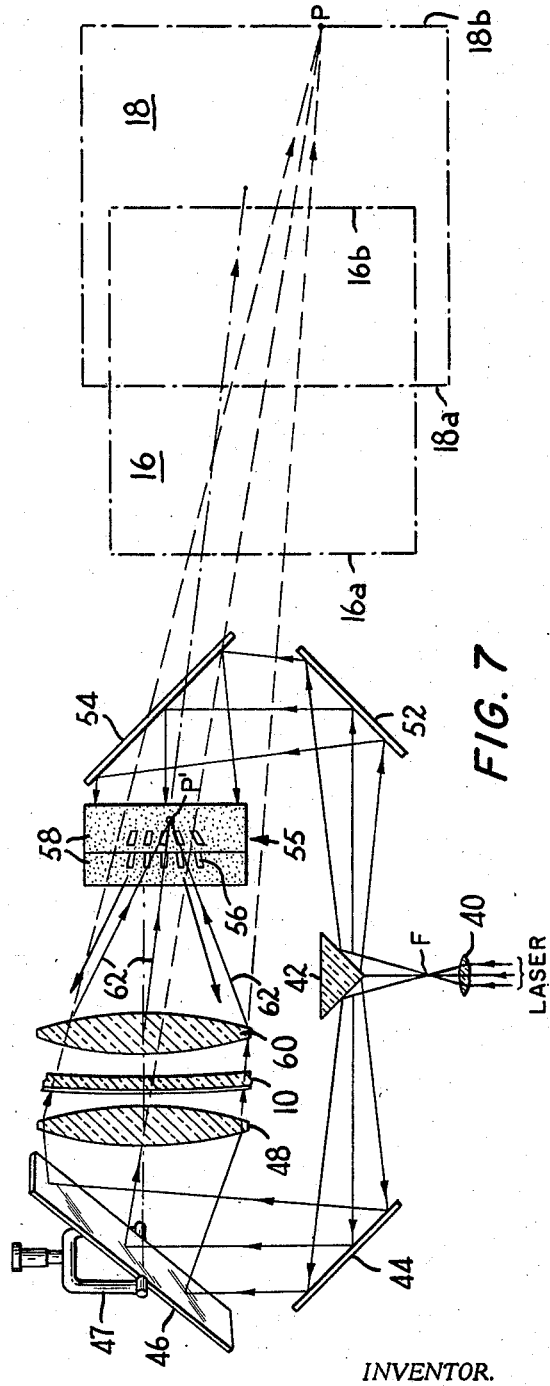

United States Patent Office

3,479,111
Patented Nov. 18, 1969

3,479,111
THREE-DIMENSIONAL PICTURE PROJECTION
Dennis Gabor, London, England, assignor to Columbia Broadcasting System, Inc., New York, N.Y., a corporation of New York
Filed Aug. 24, 1967, Ser. No. 663,098
Claims priority, application Great Britain, Sept. 8, 1966, 40,202/66
Int. Cl. G03b 19/18, 35/00, 21/32
U.S. Cl. 352—44    42 Claims

ABSTRACT OF THE DISCLOSURE

A projection screen for a three dimensional projection system including a photosensitive medium on a curved supporting substrate and coated with a black protective layer. The photosensitive medium has an optical characteristic capable of resolution equalling the wavelength of light and has a thickness exceeding that wavelength. The photosensitive medium is processed by exposing it to a first wave of coherent radiation convergent toward an image representing the position of the projector with which the screen is to be used, and to a second wave of coherent radiation issuing from images of zones in which viewing of the screen is to take place. The exposure process is similarly carried out with a first wave of coherent radiation convergent toward an image representing the position of a second projector; and with a second wave of coherent radiation emanating from images of second viewing zones related to the first zones so as to produce a three-dimensional effect when viewed.

BACKGROUND OF THE INVENTION

This invention relates to the projection of three-dimensional pictures. More particularly, the invention deals with an improved screen and system for the projection of three-dimensional images which can be viewed directly without selective optical aids, such as colored or polarizing spectacles.

In general, a three-dimensional projection screen viewed by an audience should present to the left eye of every person in the audience a different view of a spatial scene from that seen by the right eye of the same viewer. It is well known that this presentation, in the sense that every viewer shall see the same spatial scene, as in a theater, is not easily achieved owing to the impossibility or impracticability of condensing the required excessive amount of information into a reasonable film area. But the more restricted result of giving the picture depth of field in the direction of vision can be accomplished, however; i.e., a projection screen can produce, without selective viewing aids, the same effect that is obtained by colored or polarizing spectacles.

The optical problem has been specified and certain means for its solution have been described in my British Patent Nos. 541,751–3 and in my United States Patent Nos. 2,351,032–4. Basically, a three-dimensional system must include two or more projectors, each of which projects a different view of any spatial scene, and the projection screen must be capable of producing multiple images of each projector aperture in a system of viewing zones in or near the plane or planes in which the eyes of the viewers are situated, with a different system of zones for every projector. A system of this nature ensures that any one eye can see only one view at a time, i.e., the picture projected by one projector aperture only. If the left eye of a viewer is situated in the viewing zone associated with the projector for the "left" view and the other eye is in a zone similarly corresponding to the "right" projector, the correct spatial effect will be obtained. The difficulty of proper projection resides in conforming the viewing zones to the plane of cinema theaters or other audience areas. In my previous inventions, the projection arrangement utilized a complex arrangement of lenticules and mirrors. Although satisfactory, such optical arrangements are compatible with only the screen of one particular theater, and the lenticules and other optical elements which are wide enough to limit diffusion of the viewing zones at the back of the audiences are also wide enough to resolved by the eyes of the spectators in the near seats.

SUMMARY OF THE INVENTION

In accordance with the invention, a layer of a suitable radiant energy sensitive medium is formed with a thickness of a plurality of light wavelengths, with the medium having a capability of resolving one light wavelength. The medium is then exposed everywhere with a first radiation wave convergent toward an image representing the position of the source of projected picture images seen by the screen. Simultaneously, the screen is everywhere exposed with a second wave of radiation emanating from images representing the position of at least one zone from which the screen is to be viewed. This process results in an optical structure whose characteristic is effective to reflect to the viewing zone light striking the screen from the actual image source during use, but which is effective to substantially eliminate reflections from other sources or to other viewing zones. In practice, the process is repeated for a second source of picture images and for a second viewing zone. In this manner, the first and second image sources correspond to the actual projectors used, for example, in a motion picture theater, and the two viewing zones are those zones in which the left and right eyes of the spectators may be situated.

Preferably, the screen is spherical in shape, and may be constructed from several curved-surface sections arranged to approximate a spherical surface. During treatment of the medium, a radiation source having strong color lines in the visible spectrum may be employed so that the screen is compatible with color images, as well as black and white.

In the present invention, the foregoing difficulties are diminished by utilizing in the projection system a projection screen conditioned by a photographic process which can be easily modified to fit any given viewing area, such as a motion picture theater. Preferably the screen is formed of an optical microstructure unresolvable by the eye, even at close distance.

DESCRIPTION OF THE DRAWINGS

For a better understanding of the invention, together with the further aspects, advantages and aspects thereof, reference may be made to the following description, and to the drawings, in which:

FIGS. 6 and 7 are schematic side elevation and plan views of a preferred embodiment of apparatus for producing the screen; and FIG. 8 is an enlarged plan view of an optical model of the threater and viewing zones, used in the apparatus of FIGS. 6 and 7.

INTRODUCTION

Figure 1:
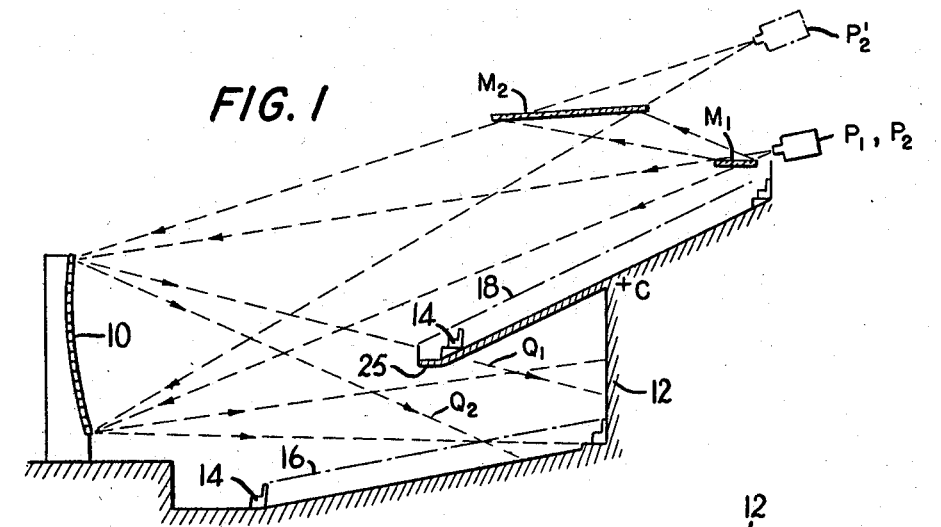
FIG. 1 is a schematic elevational view of a typical three-dimensional projection installation in a motion picture theater, employing a screen according to the invention and including two projectors.

As an introduction to the following description, it may be remarked that the invention consists in an adaptation to projection of a photographic process, which itself may be termed a hybrid combination of the method of photography in natural colors of Gabriel Lippmann, of 1891, and my own invention of the method of "wavefront reconstruction" or "holography" of 1948. This consists in producing in a fine-grain emulsion a hologram by the simultaneous action of a reference beam from one side of the emulsion, and a second beam, coherent with the first, transmitted or scattered by an object at the other side of the emulsion. It is a remarkable property of these so-called "deep" holograms that they can be viewed in white light, incident from the side opposite to that of the original reference beam, because the Lippmann-effect sorts out the original color. Only wavelengths near the original are reflected, since the other wavelengths penetrate the emulsion and can be absorbed, for example, by a black background. Such deep holograms have therefore been widely used for producing three-dimensional colored images, but not for the projection of such images.

The screen according to the invention is coated with a photosensitive emulsion which, on exposure to light, produces scattering centers with sizes smaller than the wavelength of light, or alternatively, which changes its refractive index. In the processing method to be described, the medium, or emulsion, is exposed from one side to a laser beam which converges at the other side in the relative position assumed by a virtual or real image of the source of projection images, e.g., a motion picture projector. Simultaneously, the medium is exposed from the other side to light derived from the same laser, which appears to be issuing, in a diffused fashion, from one set of the viewing zones in the actual theater.

This process cannot be carried out easily in the actual dimension of the theater, for in order to expose the whole screen at once, an optical system, such as a lens or a mirror, of the same size as the screen would be required to produce light converging in the position of the projector. Moreover, the process cannot readily be carried out piecemeal in the actual dimensions, because the coherence length of laser beams is on the order of tens of centimeters, while the dimensions of cinema theaters is on the order of tens of meters. In the invention, this difficulty is overcome by illuminating the screen piecemeal, and exposing it not to images of the full-size viewing zones of the theater, but to a small-scale model of them. The screen then views those reduced scale zones through an optical system, such that it creates from the model a virtual optical image of the zones, and of the size and configuration of the actual zones in the theater. This, as will be shown, not only reduces the optical path lengths, but also the differences in path lengths, thus ensuring coherence.

The process is repeated for the second projector of the three-dimensional system, and for a second set of viewing zones associated with the second projector. For color image presentations, the steps of the process may be repeated with laser light in three basic colors. Those six operations can be reduced to two, however, by employing beam-splitter optics during exposure to produce the projector images from a point-image source in which the light of three basic-color lasers converge.

The photosensitive medium may be an emulsion of the Lippmann type, that is to say, a dispersion of silver-halide grains of a few hundred angstroms diameter. Alternatively, the medium may be the type which, under the influence of light and by subsequent processing, creates very small bubbles in a plastic material. In one material of this type, commercially available, the nitrogen released by diazo compounds forms bubbles in a thermoplastic material. Photosensitive materials of this type have the advantage over gelatine emulsions, in that they are not sensitive to humidity, do not shrink or expand and do not absorb but scatter light. Such materials have low light sensitivity, but the exposure time in the production process can be made compatible with them. As a third alternative, the medium may be of any type in which the local refractive index changes on exposure to light.

DESCRIPTION OF THE PREFERRED EMBODIMENTS

Figure 2:
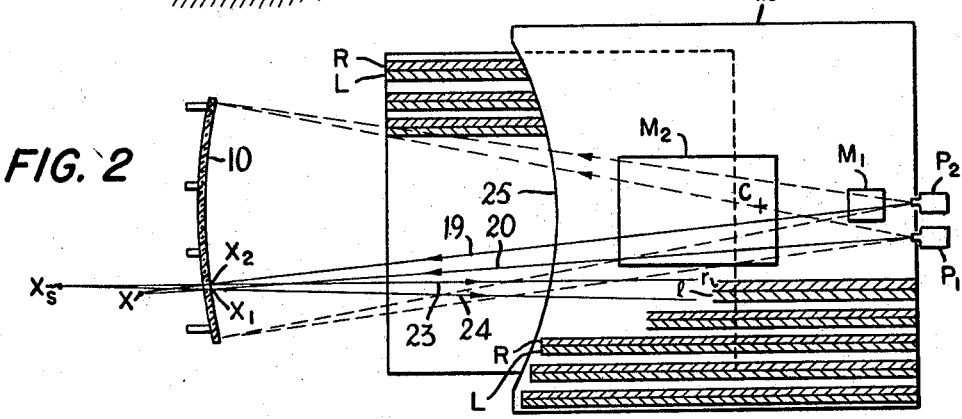
FIG. 2 is a plan view of the installation in FIGURE 2, showing schematically the viewing zones to which the screen projects.

Turning now to FIGS. 1 and 2, the three-dimensional projection system is shown to include a projection screen 10 receiving from two projectors $P_1$, $P_2$ two views of a spatial scene. The outline of the theater structure 12 is indicated by shading and, for simplicity, the theater seats 14 are assumed to exist in parallel columns extending from the front to the rear of the theater. When seated, the eyes of the audience spectators lie approximately in the planes 16, 18 associated with the orchestra and balcony seating arrangements.

The projection system and screen, according to the invention, are effective to deliver to separate sets of viewing zones in the theater picture images originating from the corresponding projectors $P_1$, $P_2$. In FIG. 2, these sets of zones are shown as narrow parallel strips L, R (left, right) within which the respective left and right eyes of most viewers are located when seated and, accordingly, are approximately coplanar with the two planes 16 and 18. As will be explained shortly, however, it should be understood that the zones L, R need not lie in the planes 16 or 18; therefore, the term "viewing zone" as used herein is not restricted to zones which are coincident with viewing eye-level. The screen 10 is specially adapted to project to a set of multiple zones L a corresponding multiple of picture images from the projector $P_1$, and to project to the set of zones R a corresponding multiple of picture images from the projector $P_2$. Thus, the R zones will receive a picture image from primarily only projector $P_1$, while the L zones will receive the picture image originating at the projector $P_2$. The width and spacing of the zones L, R is such that the left and right eyes of the spectators will sense the images received in the respective left and right zones.

For reasons to be explained subsequently, the projected images, as seen by the screen 10, should be separated by a given minimum distance. A convenient arrangement for achieving the required separation is shown in FIGS. 1 and 2, where the projectors $P_1$ and $P_2$ are in rather close proximity. Instead of projecting the image from $P_2$ directly on the screen, the image is first reflected from a mirror $M_1$ to a mirror $M_2$, and from the latter to the screen 10. This results in the formation of a virtual image of $P_2$ at $P_2'$, as shown in phantom, and satisfies the requirement of originating image separation. It should be noted, moreover, that either projector may project the right- or left-eye view, provided that the L and R zones receive images projected from the corresponding projector forming the left and right views.

The optical structure characterizing the screen 10 is such that the screen highly reflects images formed by any one projector to only one set of viewing zones, and renders images from the other projector generally invisible to an eye situated in any zone of that one set. The optical effects of this characteristic may be best grasped with reference to FIGURE 2. Assuming that projectors $P_1$ and $P_2$ throw on the screen 10 two point-images $X_1$ and $X_2$ a spectator whose eyes are in the respective positions $l$, $r$ will see a spatial point not at X, where the two rays 19, 20 passing through $X_1$ and $X_2$ actually cross, but at $X_s$ where the intersection of the reflected rays 23, 24 intersect. The apparent image of X at a position $X_s$ effectively deepens the image in the direction of the spectator's vision. This is exactly the same effect attained by the wearing of optically selective spectacles. For viewers near to the screen, the pictures will appear slightly less deep than for those at the back, because of the wider angle between the incident and reflected rays, but points at infinity will appear to be located at infinity for all viewers.

A three-dimensional projection screen should itself be invisible. If the screen of the present system includes an emulsion of grains smaller than the wavelength of light it will reflect back very little light, and most of any specular reflections will occur at the front plane of the screen 10. The specularly reflected light is made invisible in system of FIGS. 1 and 2 by the spherical configuration of the screen 10. The center of the screen is situated at point C, so that the images of the projectors $P_1$ and $P_2$ (or $P_2'$) are directed along the lines $Q_1$ and $Q_2$ (FIG. 1). The light from $P_1$ is partly stopped by the balustrade of the balcony, while the light from $P_2$ terminates in the central aisle, or otherwise out of the viewing zones. This is only one of the many alternatives for rendering the screen invisible to the audience. Another approach is to incline the spherical screen to deflect the projector images to the ceiling. The screen can be advantageously constructed of assembled cylindrical segments curved only in the vertical plane to form a polygonal approximation to a sphere.

Figure 3:
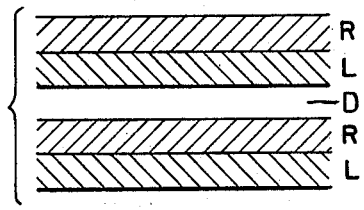
FIG. 3 shows in more detail the arrangement of viewing zones for orthoscopic vision of projected picture imgaes.

FIG. 3 illustrates on a large scale the arrangement of the viewing zones. The R and L zones are preferably between about 5 cm. and 10 cm. in width, and nominally equal to normal eye spacing of about 7 cm. Each R zone is adjacent an L zone to form a zone pair which is separated from successive zone pairs by a black zone D, approximately equal to the width of one zone, L or R. When a spectator is seated to have his right and left eyes in the R and L zones, he will observe a correct, i.e., orthoscopic, spatial scene. Should one eye of the spectator fall into the dark zone D, the picture will be visible to one eye only. Experiments have shown that, in such case, the viewer will still receive the impression of a "deep" picture; because one of the eyes is inactive, however, there will be a subjective impression that the picture is only half of normal brightness. Owing to this subjective effect of "stereoscopy by default," the viewer will never see a flat or pseudoscopic picture and, in most cases, he will automatically adjust his head position for maximum brightness and full orthoscopy.

Moreover, experiments have also revealed that pseudoscopy need not be entirely excluded for a satisfactory dimensional impression. It has been demonstrated that, surprisingly, and apart from extreme cases a pseudoscopic picture, e.g., a picture where the left eye receives an image intended for the right eye, is still resolved by the viewer as a generally orthoscopic picture, but with less depth. This fact, is attributed to associations of image size, etc. with depth or distance. Parallax, for example, is only one of several factors from which depth may be judged. If the parallax is incorrect, other observations such as perspective, may override the error to bring about the true distance relationship. For instance, there exists an ingrained conviction that familiar objects which appear larger must be nearer, and there is also the apparent impossibility of occlusion of a near object by a far one. Provided, therefore, that exaggerations are avoided, such as the appearance of objects too far forward of the screen so as to be located within a few meters of the viewer, pseudoscopy is admissible.

Figure 4:
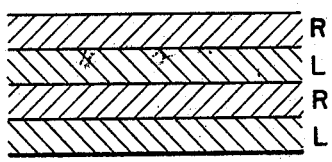
FIG. 4 is a schematic rendition of a further arrangement of viewing zones giving mixed orthoscopic and pseudoscopic viewing effects.

The foregoing conclusions make it possible to employ the simplified system of viewing zones shown in FIG. 4. There, all L and R viewing zones are contiguous so that their horizontal projection forms an unbroken plane. In this system of zones the surface or plane in which these zones are contained need not coincide with the planes 16 and 18 in which the viewers eyes are situated. The zones may be situated, for example, in a single surface, which can be termed a "sorting surface,' located anywhere in space. In this event, the viewers, with the exception of those whose eyes are in the sorting surface, will see a mixed stereoscopic and orthoscopic view; that is, they will observe an average one-half of the scene orthoscopically and this will further strengthen the illusion of a correct deep picture. They will not receive the impression of a flat (two-dimensional) picture as long as the zones L, R are narrower than the eye spacing and, of course, two views will not ordinarily be seen with one eye.

I have described the above principle of mixed stereoscopy and the sorting surface in my paper "Three Dimensional Cinema," published in The New Scientist, July 14, 1960, pp. 141-145. That principle is applicable to the present invention, and though it is less perfect than the first described viewing zone system, it has the advantage that one screen will fit almost all cinema theaters.

Figure 5:
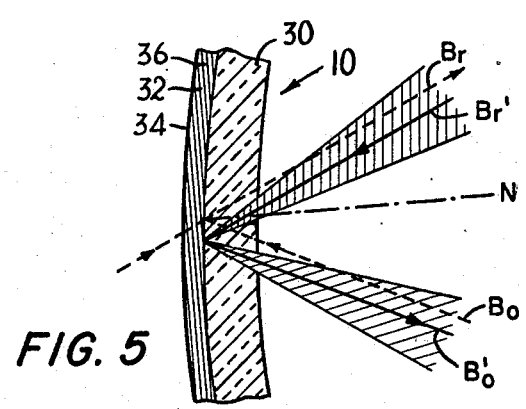
FIG. 5 is a schematic cross-section through a screen according to the invention, showing the optical paths of illumination during exposure and use.

Having now discussed the optical specifications which the projection system should meet, I now describe the projection screen by which the foregoing results are achieved. FIG. 5 is a schematic cross-section through a small segment of the screen 10. This comprises a transparent support layer 30, preferably of plastic material, which is coated with a radiant energy-sensitive or photosensitive medium layer of one of the types previously described. It is preferable to arrange the photosensitive layer 32 at the back of the transparent support 30 so that the front of the screen can be readily cleaned, and to cover the back side of the photosensitive medium with a black protective coating 34, the latter being added after exposing the screen using holographic techniques.

The general, known principle of producing deep holograms is schematically illustrated in this figure. Basically, the process comprises, the simultaneous exposure of the photosensitive medium to two radiant energy waves, one reference wave and one wave or wavefront "scattered" by a known object or image. The two beams are applied at a specified angle to the plane of the photosensitive medium, related to the angle between the projector and viewing zone under conditions of use. In FIG. 5, the radiation rays in the exposure process are shown in thick interrupted lines, the light rays in operation by continuous lines. In exposing the medium, a reference beam $B_r$ is applied from the back of the screen, simultaneoulsy with a beam $B_o$ coming from the object, coherently illuminated. In general the beam $B_r$ is directed so that it forms an angle with the screen corresponding to the angle formed by a line connecting the point of impingement on the screen with the projector image seen by the screen. The beam $B_o$ on the other hand forms a similar angle corresponding to that between the screen and a particular viewing zone. As a result, a system of stratified layers 36 of scattering centers is produced in the light sensitive medium 32, all parallel to a plane at right angles to the bisector of lines in the two directions of $B_r$ and $B_o$, and spaced by approximately half a wavelength of light. The medium is thus capable of resolving radiation having a wavelength equal to or smaller than one light wavelength.

After development, the system of layers 36 acts as a selective reflector, in two means of the term. It is direction selective, i.e., only rays not far from the cone containing the rays $B_r$, $B_r'$ and $B_o$, $B_o'$ and having the normal N to the layer system it will be strongly reflected. Outside a certain zone (shown shaded) formed between the generatrices of two cones containing those beams, the rays $B_r'$ will not be reflected as shown at $B_o'$, but transmitted and absorbed by the black backing 34. Second, the system is also color sensitive, since irrespective of the beam direction only wavelengths not very different from the original will be reflected. Thus, the medium is exposed with light containing all major color components, it will be suitable for use with color images. Through its direction-selective reflective characteristic, the screen can be processed to reflect light from a given projector emitting a beam corresponding in direction to $B_r$ (e.g., $B_r'$) so that it is reflected in a direction parallel to $B_o$ (as at $B_o'$, for example) to a known location, namely, a particular viewing zone.

FIGS. 6–8 illustrate the optical apparatus for exposing the screen. The screen area which can be simultaneously processed is limited by the types of lenses which are readily available. In order to compose the screen of as few pieces or segments as possible, it is convenient to process it in vertical strips of about 10–25 cm. width, each extending over the total height of the screen. In the drawings, those segments are shown as spherical segments, curved in both directions, but it is understood that these can be also cylindrical strips, with a straight cross-section in the plane of FIG. 7.

The optical exposing system is arranged so that during the exposure processing, each element of the screen 10 will see a reference beam from a source corresponding to the projector P in the relative position that it will assume during use. In the scheme shown in FIGS. 6–8, however, the reference beam is incident from the rear of the screen 10 through an optical system so that the photosensitive medium of the screen is subjected to a virtual, rather than real, image of the projector source. At the same time the screen segment being exposed will be subjected to radiation originating from the relative position of the corresponding viewing zones in the theater. That radiation is directed to the front face of the screen through a second optical system which simulates the size and position of the viewing zones by a small-scale model. The correct relative position of the screen element to the virtual images of P and the viewing zones is maintained throughout the photographic process.

As shown in FIG. 7, a laser source (not shown), which may produce a single or multiple laser beams of one or more colors, is focused at the point F by a lens 40. Diverging from the lens 40, the beam is split by a mirror-prism 42 into two lateral branches. In the left branch, the beam is reflected at two mirrors 44 and 46, the latter being movably supported in a cardanic suspension 47. From the mirror 46, the beam passes through the optical system, represented by the lens 48, which forms an image of F at the actual relative position P which the projector will occupy in the theater. The beam passing through the lens 48 corresponds to the reference beam $B_r$ in FIG. 5. Masks 49, 50 (FIG. 6) at either side of the screen element 10 ensure the proper registration and exposure limits for the element under processing.

The second part of the beam from the prism 40 is reflected by two mirrors 52 and 54 and illuminates a small scale-model 55 of the viewing zones. Images of the viewing zones are formed by diffusing, frosted or opal glass plates 56, covered by opaque masks 58, as best seen in FIG. 8. The masks are slotted in such a manner that the light coming from the planes 16', 18' of the model through a lens system 60 appears to be emanating from the virtual images 16, 18, which are of the size and in the position of the actual viewing zones. A light ray from the model 60 corresponds to the beam $B_o$ in FIGURE 5. Thus, a holographic record is formed on the photosensitive medium of the screen 10 in accordance with the principles discussed above.

As an example, let the line 18$b$ in the plane 18 be at 40 meters from the screen element 10, and assume an optical reduction of 50:1. Points on line 18$b'$ now come very close to the focal plane of lens 60, which may be, say, 80 cm. distant. Since the length magnification of an optical system equals the square of the transverse magnification, a total 30 meter depth of the theater viewing zones, from lines 16$a$ to 16$b$ in the plane 16, will be reduced to 3000/2500=1.2 cm. This signifies that the small scale model 55 will be disposed almost parallel to the screen element 10 during exposure, and should assume dimensions of about 40 cm. high and about 60 cm. wide when positioned about 80 cm. from the screen, i.e., when situated very near the focal plane of the lens 60.

If the arrangement shown is an $f{:}4$ optical system, one can process at one time a screen area providing a 20 cm. diagonal, such as a screen element measuring 16 cm. wide and 12 cm. high. The two planes 16' and 18' will be so nearly coincident, that both can be simulated with one piece of diffusing glass, suitably masked. A further satisfactory construction for the model 55 is a diffusing plastic sheet, masked by a drawing in black ink. In FIG. 7, the optical paths in the two branches are made approximately equal by suitable positioning of the mirrors 44, 46 and 52, 54 to ensure coherence.

During the exposure process, the images of P and planes 16 and 18 must move up or down together at the same rate as the screen segment 10 moves, but in an opposite direction, in order to correctly and completely expose the whole photosensitive layer everywhere. The motion of P can be achieved, for instance, by changing the tilt of the mirror 46. The motion of 16 and 18 may be imitated by moving the model 55 in an opposite direction and in the ratio of 1:50. In such case, a total movement of the model of 10 cm. will suffice for exposure of a screen element of 5 meters height. Alternatively, movement of the planes 16 and 18 can be achieved by moving the lens 60 in the same direction as the screen 10 and in the ratio of 1:50 only. Similarly, motion of P can be accomplished by moving the lens 48. Accurate registration of P with its position relative to the theater model 55 can be achieved by focusing it on a small hole P' in the mask of model 55, as shown by the solid line light rays 62, and moving the mirror 46 and lens 48 to keep the focus permanently in this position 55. Precise and delicate movements of those components are easily realized by servomechanisms well known in the art.

The foregoing exposure process must be repeated for the second projector position, and for the alternate viewing zones. In addition, the process should be carried out for the three basic colors if the screen is to project color images. As previously mentioned, there is no need for repeating the process for each color if beam-splitting arrangements, for example, are used to produce a radiant point source F in the three basic colors. Suitable beam-splitting optics and their use are well known to those skilled in the art. For color exposure, a single laser productive of a good basic set of spectral lines may also be employed.

Upon exposing an adjacent strip of the screen 10, the model 55 is shifted laterally by a small amount, and the angular tilt of the mirror 46 is changed to attain the correct relative directions of the beams. Again, convenient alternatives in this regard are the shifting of the lenses 48 and 60, provided only that they are sufficiently large to cover the aperture of the mask 50 in all positions. The process is similarly performed for the next and subsequent screen segments.

In assembling the screen, it is a great advantage of the present system that care need be taken only to make the joints at adjoining exposed segments invisible by suitable cementing. In contrast to the lenticular and prismatic screens previously used for three-dimensional projection, of which the elements had to cooperate with one another in a very exact manner, no inordinate accuracy is required in the assembly of the present screen. Thus in a screen of the invention, a screen area of about 5 x 5 mm. is sufficient for producing image definition of about 0.5 x .5 cm. 40 meters distant; if that small screen area is split, such as at adjoining screen elements, or if the two parts are slightly shifted relative to one another, the area will still perform satisfactorily. Good angular accuracy is desirable, however, in the mounting of screens of the type which produce zone-patterns as shown in FIG. 3; on the other hand, very little accuracy is required of screens producing the patterns illustrated in FIG. 4.

The positioning of the projectors $P_1$, $P_2$ (FIGS. 1 and 2) relative to the screen 10 is not critical. Should the projectors be misplaced by small distances from their correct positions, the zones of vision will be rotated, hinging around the point where they would intersect the beam. Thus, the relative positioning of the projectors $P_1$, $P_2$ must be accurate only to the extent of the degree of contiguity of the R and L zones.

As earlier stated, the spacing between the projectors $P_1$, $P_2$ should not be less than a certain minimum dimension. This is because the directional selectivity of deep holograms is limited; if the projector separation is too small, therefore, images from the right-view projector would become visible also in left-eye zones, and vice versa. A safe rule for the angle $\theta$ which the projectors $P_1$, $P_2$ subtend when viewed from the screen 10 is $$\theta \geq (\lambda/nd)^{1/2} \qquad (1)$$

where $n$ is the refractive index in the photosensitive medium 32 (generally about 1.5 in emulsions), $\lambda$ is the vacuum wavelength of light (about 0.5 micron) and $d$ is the thickness of the photosensitive layer 32. In Lippman emulsions, $d$ can be made about 20 microns; accordingly, $\theta$ should not fall appreciably under 0.13 radian, or 7.5°.

In non-absorbing photosensitive materials embedded in plastics, $d$ can assume greater dimensions, but the requirements of color tolerance limit the maximum thickness. If a deep hologram has been exposed with radiation of wavlength $\lambda$ and is illuminated with radiation at a different wavelength $\lambda$, a cut-off in the reflection occurs at $$\frac{\lambda' - \lambda}{\lambda} = \pm \frac{\lambda}{2nd}$$

Consequently, if $d$ is too large and white light is utilized in the reconstruction, the light efficiency of the screen becomes small. For instance, in the previous example the wavelength band between the short and long wavelength cut-offs with $\lambda = 0.5$ micron is 100 Angstroms, and the effective bandwidth is only about 50 Angstroms. Even three bands of this width sum up to only about 4% of the visible spectrum. This limitation on the thickness $d$ is far less acute, if instead of white light, sources with strong lines at selected wavelength regions are used in the projection. For instance, with $d = 40$ microns and a green line at $\lambda = 0.55$ micron, the cut-off (from expression 2) is at $\pm 25$ Angstroms. This spectral characteristic is approximately equivalent to a spectral window of 25 Angstroms, and is sufficient to accommodate the rather broad lines of high-pressure arc sources. A mercury-cadmium arc, with strong lines at 4358 A. (Hg, blue-violet), 5461 A. (Hg, green) and 6438 A. (Cd, red), is an example of a suitable light source for the projection.

It should be remarked, however, that it is possible to separate almost completely the spectral selectivity from the directional selectivity by employing rather wide groups of spectral color lines during the photographic screen formation. Examples of such lines are the green group of the xenon ion laser and the blue group of the krypton ion laser. A screen which has been exposed to radiation of this type can be made with a large thickness $d$, giving it high directional selectivity and a good reflection index during projection over relatively broad regions of the spectrum. As a result, the screen will have good light efficiency, even if used with a white light projection source.

In cinema theaters, in which a spacing of the two projectors on the order of 5–8 meters may be inconvenient or limited by theater structure, a pair of mirrors $M_1$, $M_2$ can be arranged as illustrated in FIG. 1 to form a virtual image of one of the projectors.

It may be noted that though I have described the invention in detail as it relates to cinema theaters, the invention can be applied equally well and, in fact, more easily to small installations requiring a three-dimensional display. Examples of such smaller environments include training apparatus for pilots and three-dimensional television projection for air traffic supervision and the like.

Thus, although the invention has been described with reference to specific embodiments, many modifications, variations and partial improvements will be obvious to those skilled in the art. Accordingly, all such modifications, variations and improvements are intended to be within the scope and spirit of the appended claims.

I claim:
1. A method for making a projection screen for a three-dimensional optical projection system, comprising:
   forming a layer of photosensitive medium having a thickness equal to a plurality of wavelengths of light from a given source and capable of resolving light having a wavelength equal to a wavelength from said source;
   exposing the photosensitive medium to a first wave of coherent radiation convergent toward an image representing the position of a projector with which the screen is to be used; and
   simultaneously exposing the photosensitive medium to a second wave of coherent radiation emanating from a position representing the location of at least one zone from which images projected on the screen may be viewed.

2. A method according to claim 1, in which:
   the first and second waves of radiations are produced by at least one laser.

3. A method according to claim 1, in which:
   the photosensitive medium is an emulsion productive of light-scattering centers having a dimension less than the wavelength of said exposing radiation wave.

4. A method according to claim 1, in which:
   the photosensitive medium is an emulsion of which the index of refraction is altered upon exposure by said radiation waves.

5. A method as defined in claim 1, in which:
   the photosensitive medium comprises a dispersion of silverhalide grains having a nominal diameter less than about 500 Angstroms.

6. A method as set forth in claim 1, in which:
   the first and second waves are incident upon the photosensitive medium from opposite sides thereof.

7. A method as defined in claim 1, in which:
   the first wave of radiation impinges the back of the photosensitive medium and the second wave of radiation issues from at least one point in front of the photosensitive medium, relative to the screen.

8. A method as defined in claim 1, further comprising the step of:
   providing a reduced-scale model of the viewing zone, the reduced scale viewing zone being arranged to direct coherent radiation to the photosensitive medium; and
   presenting a full scale image of the radiation from the reduced-scale zone to the photosensitive medium.

9. A method in accordance with claim 1, further comprising the step of:
   exposing the photosensitive medium to coherent radiation convergent toward an image representing the position of a second projector, spatially separated from the first projector; and
   simultaneously exposing the medium to coherent radiation emanating from a position representing the location of at least one second viewing zone, distinct from the first zone, from which projected images from said second projector may be viewed.

10. A method as defined in claim 7, in which:
    the images of the first and second projector positions substend an angle at the photosensitive medium at least equal to $(\lambda/nd)^{1/2}$, where $n$ is the refractive index in the medium, $\lambda$ is the vacuum wavelength of light and $d$ is the thickness of the layer.

11. A method as defined in claim 7, in which:
each of the first and second viewing zones contains a narrow strip extending generally away from the screen, the strips lying in a common plane located in front of the screen to form an orthoscopic sorting surface.

12. A method as defined in claim 11, in which:
the adjacent strip pairs are substantially contiguous to form alternating series of first and second zone strips.

13. A method as defined in claim 9, in which:
each of the first and second viewing zones contains a narrow strip extending generally away from the screen and lying in a reference plane generally parallel to the plane in which the eyes of viewers are situated.

14. A method according to claim 13, in which:
the strips of the first and second zones are arranged in pairs containing one strip of each zone, each strip having a width of between about 5 cm. and 10 cm. and being adjacent the other of the pair.

15. A method as defined in claim 14, in which:
adjacent strip pairs are separated by a distance approximately equal to the width of one strip.

16. A method as defined in claim 1, in which:
the first and second waves of radiation contain distinct wavelengths distributed over the visible spectrum.

17. A projection screen for a three-dimensional projection system, comprising:
a radiant energy-sensitive medium formed in a layer conforming to the surface of the screen and having a thickness equal to a plurality of light wavelengths, the medium having a capability of resolving one wavelength of light, the medium having an optical characteristic which everywhere selectively reflects light impinging the screen from the direction of a fixed point to at least one of a set of zones from which the screen is to be viewed but which does not appreciably reflect light from locations distinct from the point or to points lying outside of said set of zones.

18. A screen according to claim 17, in which:
the photosensitive medium is an emulsion productive of light-scattering centers having a dimension less than the wavelength of light.

19. A screen according to claim 17, in which:
the photosensitive medium is an emulsion of which the index of refraction is altered initially upon exposure to light.

20. A screen as defined in claim 17, in which:
the photosensitive medium comprises a dispersion of silverhalide grains having a nominal diameter less than about 500 Angstroms.

21. A projector screen as defined in claim 17, further comprising:
a transparent substrate layer disposed adjacent the surface of the medium facing said point.

22. A projection screen as defined in claim 17, further comprising:
a radiation absorbant layer disposed adjacent the surface of the medium away from said point to diminish reflection of light selectively transmitted through the medium by the action of said optical characteristic.

23. A projector screen as defined in claim 17, in which:
said optical characteristic further selectively reflects light impinging the screen from the direction of a second fixed point to at least one of a second set of viewing zones distinct from the first set of zones, but does not appreciably reflect to the second set of zones the light originating from the first point and does not reflect light from the direction of the second point to the first set of zones.

24. A screen as defined in claim 23, in which:
each of the first and second viewing zones contains a narrow strip extending generally away from the screen and lying in a reference plane generally parallel to a plane of viewing.

25. A screen according to claim 23, in which:
the strips of the first and second zones are arranged in pairs containing one strip of each zone, each strip having a width of between about 5 cm. and 10 cm. and being adjacent the other strip of the pair.

26. A screen as defined in claim 23, in which:
adjacent strip pairs are separated by a distance approximately equal to the width of one strip.

27. A projection screen in accordance with claim 23, in which:
the first and second points substend an angle at the photosensitive medium at least equal to $(\lambda/nd)^{1/2}$ where $n$ is the refractive index in the medium, $\lambda$ is the vacuum wavelength of light and $d$ is the thickness of the layer.

28. A screen as defined in claim 23, in which:
each of the first and second viewing zones contains a narrow strip extending generally away from the screen, the strips lying in a common plane located in front of the screen to form a orthoscope sorting surface.

29. A screen as defined in claim 28, in which:
the adjacent strip pairs are substantially contiguous to form alternating series of first and second zone strips.

30. A projection screen according to claim 17, in which:
the surface of the medium layer facing the point is convex and spherically curved.

31. A projection screen according to claim 17, in which:
the surface is convex and cylindrically curved.

32. A projection screen according to claim 17, in which:
the layer is formed from a plurality of adjoining elements, the surfaces of which are cylindrically curved to form a polygonal approximation of a convex spherical surface.

33. In a three-dimensional projection system, the combination of:
first and second means for projecting spaced apart images of a scene to be viewed; and
a projection screen positioned to be impinged by the images from the first and second projection means, the screen having a characteristic effective to reflect the image from the first projection means to at least one of a first set of zones from which the screen is to be viewed and to substantially attenuate reflection of such image to points lying outside of said set of zones,
said characteristic further being effective to reflect the image from the second projection means to at least one of a second set of viewing zones and to substantially attenuate the reflection of such image to said first set of zones.

34. A projection system according to claim 33, in which:
the screen substantially attenuates the reflection of images to said first and second set of zones originating from points distant from said first and second projection means, respectively.

35. A system as defined in claim 33, in which, one of the first and second projection means includes:
means for presenting to the screen a virtual image of the view formed by said one projection means.

36. A system as defined in claim 35, in which:
the virtual source of the image is vertically spaced apart from the source of the image presented by the other of the projection means.

37. Apparatus for producing a holographic three-dimensional projection screen, comprising:
at least one source of coherent radiation having a wavelength in the visible spectrum;
means for directing a first wave of coherent radiation from the source converging through a radiant energy-sensitive medium of the screen toward a point representing the point of origination of images to be projected on the screen;

means for simultaneously directing at the medium a second wave of coherent radiation from the source and impinging the radiant energy-sensitive medium from a position representing the location of at least one zone to which the images from the point of origination are to be reflected.

38. Apparatus in accordance with claim 37, in which: the source is productive of radiation containing distinct wavelengths distributed over the visible spectrum.

39. Apparatus in accordance with claim 37, in which: the first and second waves of radiation are produced from a common source productive of a coherent beam; and
the wave directing means include means for reflecting at least a portion of the source beam in two distinct directions.

40. Apparatus in accordance with claim 37, in which the first wave directing means includes a mask receiving radiation from the source and having radiation-transparent portions for forming and transmitting therethrough an image representing the geometry of the viewing zones.

41. Apparatus in accordance with claim 40, in which the viewing zone representation is reduced in scale, the apparatus further comprising:
optical means for presenting to the radiant energy-sensitive medium of the screen in full-scale image of the viewing zones.

42. Apparatus according to claim 33, in which: the first wave directing means directs the first wave through the medium from a side opposite to the side impinged the second wave.

References Cited

UNITED STATES PATENTS

| | | | |
|---|---|---|---|
| 2,351,033 | 6/1944 | Gabor | 352—58 |
| 3,408,143 | 10/1968 | Mueller | 352—38 X |

NORTON ANSHER, Primary Examiner

R. A. WINTERCORN, Assistant Examiner

U.S. Cl. X.R.

350—117, 125; 352—38, 44, 58, 60, 85

PO-1050
(5/69)

UNITED STATES PATENT OFFICE
CERTIFICATE OF CORRECTION

Patent No. 3,479,111          Dated November 18, 1969

Inventor(s) Dennis Gabor

It is certified that error appears in the above-identified patent and that said Letters Patent are hereby corrected as shown below:

Column 2, line 10, insert --be-- after "to"; line 66, "imagae" should be --images--. Column 3, line 5, "threater" should be --theater--. Column 6, line 72, insert --if-- after "thus,". Column 14, line 9, insert --by-- after "impinged".

Signed and sealed this 23rd day of January 1973.

(SEAL)
Attest:

EDWARD M. FLETCHER, JR.
Attesting Officer

ROBERT GOTTSCHALK
Commissioner of Patents